United States Patent

[11] 3,548,141

| [72] | Inventors | Melvin Edward Remus<br>Park Ridge;<br>Franklin Chaloner McNair, Wilmette, Ill. |
|---|---|---|
| [21] | Appl. No. | 761,673 |
| [22] | Filed | Sept. 23, 1968 |
| [45] | Patented | Dec. 15, 1970 |
| [73] | Assignee | Taylor Forge, Inc.<br>Bellwood, Ill.<br>a corporation of Illinois |

[54] METHOD AND APPARATUS FOR FORMING TUBING
22 Claims, 8 Drawing Figs.

[52] U.S. Cl. .................................................. 219/62, 219/67
[51] Int. Cl. ........................................... B23k 11/08
[50] Field of Search .......................................... 219/62, 59, 64, 67, 159, 160

[56] References Cited
UNITED STATES PATENTS
3,201,559  8/1965  Morris.......................... 219/62

| 1,502,052 | 7/1924 | Naylor.......................... | 219/62 |
| 2,233,233 | 2/1941 | Williams....................... | 219/62 |
| 2,873,353 | 2/1959 | Rudd............................ | 219/62 |
| 3,090,336 | 5/1963 | Gruter.......................... | 219/62X |
| 3,287,536 | 11/1966 | Fay............................. | 219/62 |

*Primary Examiner*—J. V. Truhe
*Assistant Examiner*—L. A. Schutzman
*Attorney*—Ward, MC Elhannon, Brooks and Fitzpatrick ABSTRACT: An improvement in high frequency electrical welding of edges of metal strip with a curved weld seam, particularly, tubing having a helical or spiral weld seam and formed from a single metal strip, which comprises forming the edges of the strip with longitudinally extending projections or ridges, bringing the so-formed edges into closely-spaced, side-by-side relation, supplying high frequency current to the so-formed and positioned edges and while advancing and bending the strip and edges into the desired curved form, maintaining such relation of the edges but with diminishing spacing until they are brought together at a subsequent weld point using pressure at least partly applied to such projections.

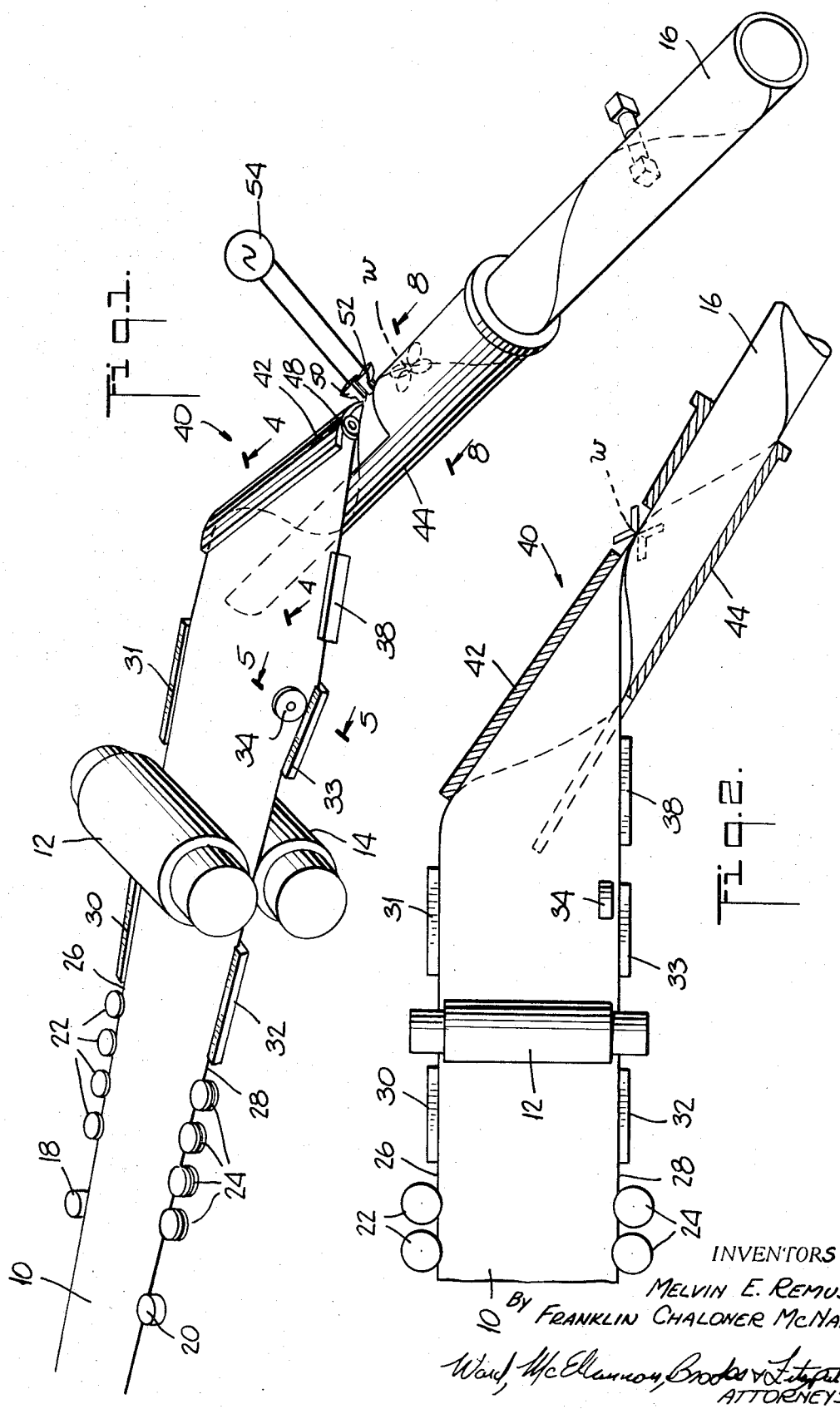

PATENTED DEC 15 1970
3,548,141
SHEET 2 OF 2
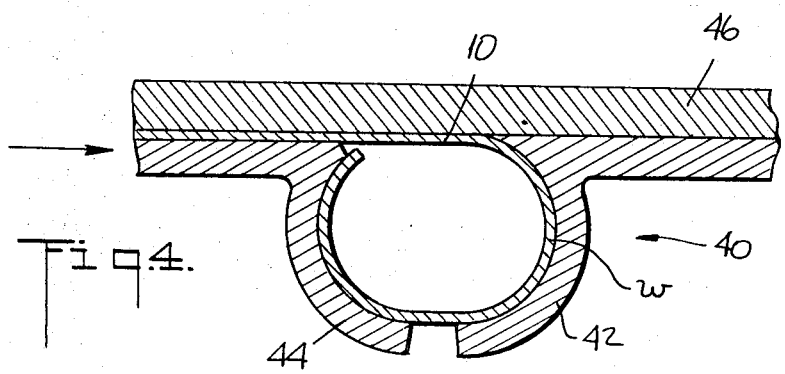
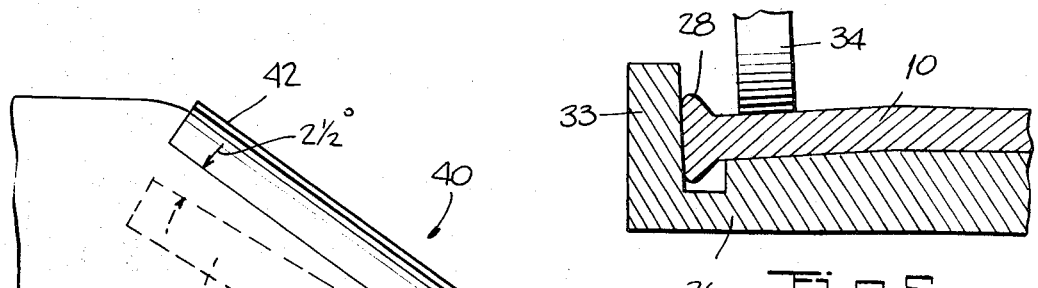
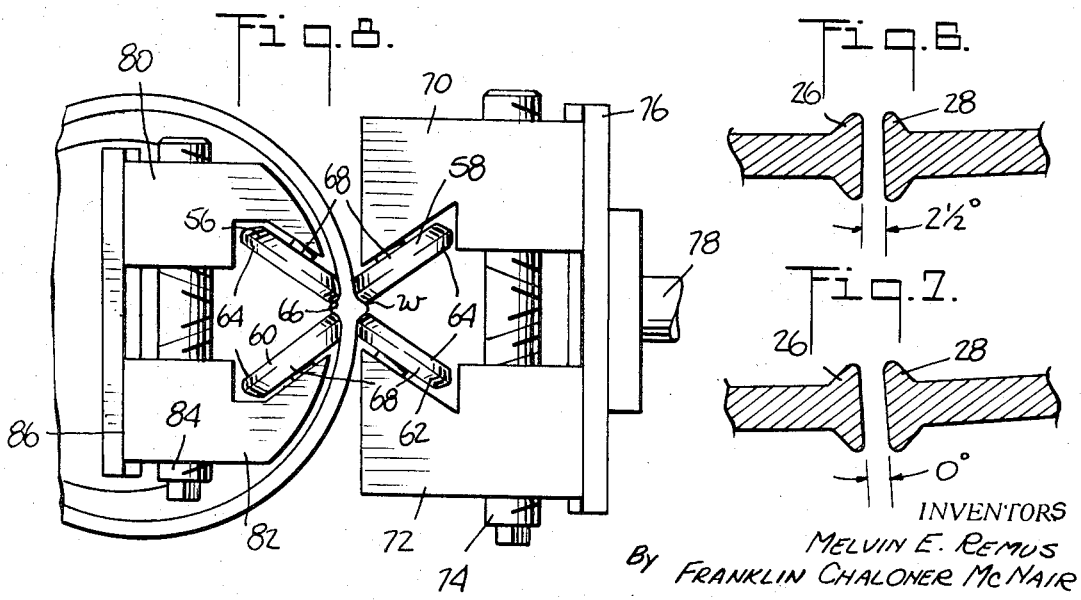
INVENTORS
MELVIN E. REMUS
FRANKLIN CHALONER McNAIR
BY
Ward, McEllumon, Brooks & Fitzpatrick
ATTORNEYS

METHOD AND APPARATUS FOR FORMING TUBING

This invention has to do with method and apparatus for forming tubing with a helically extending weld line, the welding being accomplished by utilizing high frequency electrical current.

Heretofore, it has been proposed, in the U.S. Pat. to Rudd No. 2,873,353, for example, to form helically welded tubing by advancing a generally flat metal strip at an angle to the axis of the tubing being formed, forming a succession of convolutions which are advanced longitudinally of the axis, while the trailing edge of each completely formed convolution is welded to the forward edge of the advancing strip by applying high frequency current to such edges shortly in advance of the weld point where they come together. That is, a gap occurs between the trailing edge of the last complete convolution and the edge of the strip which is advanced to the weld point, and these edges are heated by the high frequency current applied by contacts engaging opposite sides of the gap respectively, the current flowing from the contacts to and from the weld point.

Although the methods described in said U.S. Pat. No. 2,873,353 have proven to be very practical and successful under many conditions and circumstances, certain difficulties are encountered which sometimes make it difficult to perform the type of welding therein described. For example, it will be appreciated that as the strip is bent around to form the tubing, substantial stresses are encountered and substantial forming forces are required as the strip is guided and bent into tubular form. Such stresses and forces make it difficult to control the spacing between the advancing edges which are to be welded together and may cause the points on such faces which come into contact at the weld point to be at a variable distance from the point at which the current is supplied. Both such difficulties may cause irregular and uneven heating of the edges and hence variations in the resulting welds.

The effect of such difficulties will be more readily understood when the electrical effects during the heating of the edges to be welded are considered. Due to the well known proximity effect, and the fact that at any given instant the current flowing on the edge portions is flowing in opposite directions, the current concentrates at the surfaces of the edge portions which are nearest each other, and the amount of concentration depends on the amount of spacing between such edge portions. The amount of heating of the edge portions to be welded together depends upon such concentration, the magnitude of the heating current and the time taken for the edge portions to pass from the points at which current is supplied, e.g. the positions of the contacts, to the weld point. Accordingly, if the spacing of edge portions varies and/or if the position of the weld point with respect to the contacts wanders, then the heating of the surfaces to be welded together varies which may produce nonuniform welds and in some cases unsatisfactory welds. This is particularly true when butt welding is being performed using sheet metal which is relatively thick and where uniform heating across the faces of the edges is desired. Accordingly, if the edge portions are relatively widely spaced at the time that the current is supplied, such as is shown in said U.S. Pat. No. 2,873,353, and then approach each other, the current will first flow in the edge portions at a depth which is relatively great as compared to the depth to which the current flows in the edge portions when the edge portions approach the weld point and hence are less widely spaced. Since it is desired to heat substantially only the faces to be welded together, there is a decrease in efficiency if the faces are not close together during all of the time that the current is supplied thereto.

In addition, at the point where the current is supplied in the arrangement shown in U.S. Pat. No. 2,873,353 and for a substantial distance thereafter, the closest surfaces are those at the corners of the sheet nearest each other which causes such corners to be heated to an extent greater than the remainder of the faces. In some instances, if the heating is sufficient to produce welding temperature across the entire faces to be welded, the corners may actually become molten and irregular whereas in other cases, if sufficient care is not used, the faces are not heated to the necessary temperature across the entire extent thereof and therefore the weld attained is not completely uniform.

Also, in the arrangement shown in said patent, there is a wiping or sliding action between the approaching edge surfaces as they near the weld point which may cause undesirable distortion of the weld seam.

Ideally, in most butt welding using high frequency electric currents, e.g. 50,000 Hz. or higher, the faces to be welded together are side-by-side and close together from the time that current is supplied thereto up to the weld point which is maintained at a fixed position. In other words, the distance from the current-supplying contacts to the weld point is maintained constant, the faces are close together and side-by-side under the contacts and the faces remain side-by-side and approach each other with a uniformly diminishing spacing as they move from the contacts to the weld point. Although it is readily possible to meet these conditions in longitudinal, butt seam welding where the edge portions move in straight lines, the bending, control and space problems with spiral or curved seam welding have made it difficult to meet them in such latter type of welding, and they are not, for the reasons set forth above, met in the arrangement set forth in U.S. Pat. No. 2,873,353.

A method which approaches the ideal butt-welding electrical conditions is disclosed in U.S. Pat. No. 3,201,559, but such method requires relatively complicated forming apparatus for preforming the sheet metal substantially into a tube before the welding current is applied. Furthermore, in such method it is still difficult to control the relative positions of the approaching edges and of the weld point with respect to the contacts with the desired precision and the seam has a relatively large helical pitch. One reason for the use of the less than electrically ideal arrangement shown in said U.S. Pat. No. 2,873,353 is that it is relatively simple and provides mechanical advantages in forming the tube and pressing the edges together. With this invention, the mechanical and other advantages of the latter arrangement can be retained, and yet the edges can be welded together with high frequency current at a point where both edges are curved, the current can be supplied to the edges where they are substantially side-by-side and close together, and the desired control of the edges and the weld point can also be attained. In accordance with the preferred form of the invention, the edges to be welded together are upset or distorted so as to provide ridges therealong prior to or at the point where the contacts are applied thereto, and with such ridges the necessary control of the edges both widthwise and laterally of the sheet can be accomplished in a manner which will permit the ideal butt-welding conditions to be met. Such ridges stiffen the edges of the sheet reducing flexing thereof and provide portions which may be engaged for positioning the edges and forcing them together.

Briefly, the invention is an improvement in methods and apparatus for welding together the edge portions of metal strip with a curved welded seam, such as a helical or spiral, using high frequency electrical currents, which improvement comprises forming longitudinal projections or ridges at the edge portions, bringing such formed edge portions into side-by-side, closely spaced relation, supplying high frequency current to the so-formed and positioned edge portions and while advancing and bending the strip and edges into curved form, maintaining such relation of the edges but with diminishing spacing until the edges are brought together at a weld point subsequent to, or downstream of, the points at which current is supplied using pressure at least partly applied to the longitudinal projections.

There has thus been outlined rather broadly the more important features of the invention in order that the detailed description thereof that follows may be better understood, and in order that the present contribution to the art may be better appreciated. There are, of course, additional features of the invention that will be described hereinafter and which will form the subject of the claims appended hereto. Those skilled in the art will appreciate that the conception on which this disclosure is based may readily be utilized as the basis for the design of other structures for carrying out the several purposes of the invention. It is important, therefore, that the claims be regarded as including such equivalent constructions as do not depart from the spirit and scope of the invention.

Several embodiments of the invention have been chosen for purposes of illustration and description, and are shown in the accompanying drawings, forming a part of the specification, wherein:

FIG. 1 is a perspective view showing the essential features of the apparatus in accordance with the invention in a preferred form;

FIG. 2 is a plan view, partially in longitudinal section, of the apparatus of FIG. 1;

FIG. 3 is a detailed plan view of the forming device;

FIG. 4 is an enlarged sectional view of the forming device taken along the line indicated at 4-4 in FIG. 1;

FIG. 5 is an enlarged view of the crimping means taken along the line indicated at 5-5 in FIG. 1;

FIGS. 6 and 7 are enlarged sectional views of the longitudinal projections at the edge portions of the strip of sheet material; and FIG. 8 is a transverse sectional view taken through the weld point, as indicated at 8-8 in FIG. 1.

Referring to the drawings in further detail, as shown in FIG. 1, a strip 10 of sheet material which is to be formed into tubing, is pulled from a suitable reel thereof (not shown) by frictional engagement between a pair of driven rollers 12 and 14. The strip is advanced in a direction at an angle with respect to the tubing 16 being formed. The strip first passes between edge guide rollers 18, 20. Longitudinal projections or ridges are formed at the edge portions of the strip, as by means of passing the strip past a series of mating edge upsetting rolls 22, 24. Preferably, as shown in FIGS. 6 and 7, these cross sections are such that bulging portions 26 and 28, respectively, protrude both above and below the normal upper and lower surfaces of the workpiece. Preferably, although not necessarily in all cases, the projections on the edges are alike, as shown. It will be appreciated that when bending the strip to a radius, the outside edge is under tension and increases in length, and hence decreases in width, thereby causing the edge bulging portion 28 to be disposed at an angle of the order of about 2-½° with respect to the edge bulging portion 26, as seen in FIG. 6. To correct for this angular difference so that the two edges 26 and 28 come together in parallel relationship as they approach the weld point, the projection on the trailing edge 26 is formed so that its face is at an angle which differs from the angle of the edge face of the leading edge 28 by about 2-½° and as shown in FIG. 7, the edge faces will then be substantially parallel as they are brought together. This operation is performed by the upsetting rolls 22.

After passing the upsetting rolls 22 and 24, the strip 10 passes between in-feed guides 30, 32, positioned in front of the drive rolls 12 and 14; and in-feed guides 31, 33 positioned subsequent to the drive rolls.

It will also be appreciated that when bending sheet material to form tubing in the manner described, the material has a tendency to remain straight, thereby causing the leading edge to lift forming a flared-out pattern. Applicant has discovered that by imparting a downwardly directed curvature to the leading edge 28, this problem is overcome. This curvature is imparted to the sheet 10 by means of a crimping roll 34 acting against a mating backup portion 36 of the guide 33, as best seen in FIG. 5. Subsequent to the crimping roll 34 is another in-feed guide 38, FIG. 1.

Next, the strip 10 is formed into a succession of convolutions with abutting edges while advancing such convolutions longitudinally of the axis. The strip 10 is embraced in a forming device, indicated generally at 40. This device comprises a first segment 42, FIGS. 1—4, disposed at an angle with respect to the axis of the tubing being formed of between about 2° and about 4° preferably of the order of about 2-½° to maintain the edges of the strip in side-by-side, closely spaced relation with a narrow V-shaped gap therebetween substantially throughout their heating period and to impart a succession of partially formed convolutions to the strip. The first segment guides the strip through an arcuate angle of between about 90° and about 180° preferably about 180° as seen in FIG. 4. Then, the strip passes into the embrace of a second segment 44 coaxially disposed with respect to the axis of the tubing being formed to complete each partially formed convolution. As seen in FIG. 4, the forming device 40 is mounted by means of bracket 46.

Reverting to FIG. 1, the edges of the strip pass beside a seam guide 48 disposed therebetween at a location in advance of the weld point and after the strip starts to form into a convolution. This guide aids in maintaining the edges in predetermined spaced relationship one with respect to the other.

Thence, the trailing edge of each convolution is welded to the forward edge of the strip at a substantially fixed weld point $w$, located at a predetermined angular distance beyond the point where the strip starts to form into a convolution, and hence after the edges are brought into side-by-side relation, by causing high frequency current to flow on the edges in advance of the weld point to heat same to welding temperature upon reaching the weld point. The predetermined angular distance depends inter alia upon the speed of feed of the strip, the current applied, and the material being welded. It has been found satisfactory to employ a predetermined angular distance of the order of about 90° after the tangent point or the point where the strip starts to form into a convolution. The predetermined angular distance must be sufficient to provide sufficient linear distance in advance of the weld point to allow the two edges to be in side-by-side, closely spaced relation and to form a narrow V-shaped gap therebetween substantially throughout the heating period. This provides a very good electrical arrangement, for the reasons set forth hereinbefore. In the example shown in FIG. 1, the high frequency current is caused to flow along the edge by means of a pair of contacts 50, 52, suitably mounted to engage respectively at opposite sides of the gap, these contacts being connected to a suitable source of high frequency current, as indicated at 54, FIG. 1, for supplying high frequency current which flows on the opposed gap edges from the contacts to and from the weld point $w$, the current being sufficient to heat such edges in advance of that point up to welding temperature by the time the edges come into engagement with each other at the weld point. The frequency of such current should preferably be in the neighborhood of 300,000 or 400,000 cycles per second or higher, although lower frequencies down to the range of 50,000 to 100,000 cycles per second may under some circumstances be used. Also, if preferred, the high frequency current may be inductively applied by known methods to the gap edges at this region.

As indicated in FIGS. 1, 2 and 8, the edge formation at the weld point $w$ passes through a throatlike space between the periphery of four rolls 56, 58, 60 and 62. Each of these rolls has a first peripheral surface area, as indicated at 64, which is positioned and shaped to roll against 35 apply heavy pressure to side surface areas, as at 66, on each projecting portion of the edge formations on both workpieces. Also, each of the rolls preferably has a second peripheral surface area, as at 68, positioned to have rolling engagement under pressure against a surface area on the workpiece along and immediately adjacent the base of each projecting portion. It will be noted that each of the side areas on the projections form, in connection with an adjacent normal surface area on the workpiece, a grooved or channellike region into which the rolls, shaped as above described, press diagonally so as to apply a heavy force having a component directed generally vertically and another component directed generally horizontally toward the seam line. To accomplish this, each of the rolls is rotated about an axis such that the rolls rotate in or along the planes which are inclined to the normal surface of the workpieces, such planes intersecting within, or in the general region of, the weldment being formed.

As further shown in FIG. 8, the rolls 58 and 62 are mounted on suitable bearing blocks 70 and 72. A shaft 74 may pass through these blocks, such shaft being threaded in opposite directions on its opposite ends so that upon rotating same the bearing blocks may be brought together or spaced further apart. Also, suitable means, such as a strip 76, may be mounted to press down against the bearing blocks 70 and 72, the member 76 being supported as by any suitable means at 78, adjustable in height, or, if desired, means 78 may take the form of a fluid pressure operated cylinder and piston means for applying downward pressure. In either case, the member 76 will serve to hold the bearing blocks and consequently the rolls 58 and 62 at the desired elevation above the weld point. Similar bearing blocks, such as 80 and 82, may be provided for the rolls 56 and 60, and the spacing of these may be adjusted, as by a threaded rod 84. This assembly may be carried on any suitable support 86, which may be carried by a roller (not shown) for rolling on the lower inside surface of the tubing as the latter advances.

It will be appreciated that the concepts of this invention are applicable to the formation of corrugated tubing as well as plain tubing, illustrated hereinbefore. It will also be appreciated that the term "weld point" is used herein for convenience, although actually the abutting edges when brought together under pressure become welded along a line or area. Also, the term "seam line" is used herein for convenience, but actually the weldment is formed along a band represented by the curved surface areas of the two edges as forced together. Then too, the apparatus as shown in the various FIGS. may be oriented in various positions and the terms such as "upper" and "lower" are used herein merely for convenience in referring to the parts in the positions and orientation as shown.

We claim:

1. Method of welding together the edge portions of metal strip with a curved welded seam comprising advancing said edge portions toward each other, at least one of said edge portions being advanced along a substantially rectilinear path, until the edge portions are brought into side-by-side, closely spaced relation at a predetermined point with the edge faces in face-to-face relation and with corresponding points on said faces at the same level, continuing the advance of said edge portions while causing said edge portions to follow curved paths transverse to the direction of advance after said predetermined point and while maintaining said relation thereof but while diminishing the spacing between said edge faces until said faces are brought together at a weld point subsequent to said predetermined point, supplying high frequency current to said edge portions in advance of said weld point and between said weld point and substantially said predetermined point, whereby said current flows along said edge portions while they are caused to follow said curved paths to heat the curved edge portions to welding temperature upon reaching said weld point, and applying pressure to said edge portions at said weld point to weld them together.

2. Method according to claim 1 wherein said edge faces are positioned with their faces, in cross section, substantially parallel to each other at said predetermined point and are maintained substantially parallel to each other during their advance from said predetermined point to said weld point.

3. Method according to claim 1 wherein prior to reaching said predetermined point, upstanding, longitudinally extending projections are formed at said edge portions.

4. Method according to claim 3 wherein said pressure is applied, at least in part, to said projections and in a direction forcing said edge faces toward each other.

5. Method according to claim 3 wherein said projections are formed by upsetting, and thereby increasing the thickness dimension of, said edge portion.

6. Method according to claim 1 wherein said one edge portion is the leading edge portion of a metal strip and the other edge portion is the trailing edge portion of the same strip and wherein said strip is formed into a succession of convolutions which are welded together to form a tube having a helical weld seam.

7. Method according to claim 6 wherein prior to reaching said predetermined point upstanding, longitudinally extending projections are formed at said edge portions.

8. Method according to claim 7 wherein said pressure is applied, at least in part, to said projections and in a direction forcing said edge faces toward each other.

9. Method according to claim 6 further comprising deflecting said trailing edge by an angle of the order of 2½° with respect to said leading edge at least by the time said edges reach said predetermined point.

10. Method according to claim 6 further comprising the step of curving the leading edge portion transversely to the strip width in advance of said predetermined point.

11. Method of forming tubing with a helically extending weld line, which comprises: advancing a metal strip in a substantially rectilinear path at an angle to the axis of the tubing being formed, while passing the strip past an upsetting means to cause the edges of the strip to have imparted thereto longitudinal projections; thereafter, embracing said strip in a first segment of a forming device to bend said strip and impart a partial convolution to said strip; then, embracing said strip in a second segment of said forming device to complete said partial convolution while advancing the convolution longitudinally of said axis, said trailing edge being brought into close-spaced, side-by-side relation to said leading edge with the edge faces in face-to-face relation and with corresponding points on the faces at the same level prior to the point of formation of said strip into a partial convolution and said edges being maintained in said relation but with diminishing spacing as said strip is bent and said convolution is formed until said faces are brought together at a weld point subsequent to said point of formation; welding the trailing edge of each convolution to the leading edge of the strip at said weld point by causing high frequency current to flow on said edges in advance of the weld point and after said strip passes said point of formation to heat same to welding temperature upon reaching said weld point; and applying pressure to said edges at said weld point at least partly applied to said projections and in a direction forcing said edge faces toward each other to weld said edges together.

12. Method of forming tubing according to claim 11 wherein said first segment is disposed with its strip embracing face at an angle with respect to said axis of the order of about 2½°, and said second segment is coaxially disposed with respect to said axis, and further comprising imparting a downwardly directed curvature to the leading edge of said strip intermediate said first segment and said upsetting means.

13. Apparatus for welding together the edge portions of metal strip with a curved weld seam comprising means for advancing said edge portions toward each other and for advancing at least one of said edge portions along a substantially rectilinear path until said edge portions are brought into side-by-side, closely spaced relation at a predetermined point with the edge faces in face-to-face relation and with corresponding points on said faces at the same level, means for bending said edge portions into curved form as they advance beyond said predetermined point and for maintaining such relation of said edge portions but with diminishing spacing therebetween until the edges are brought together at a weld point subsequent to said predetermined point, a high frequency current source connected to supply heating current to said edge portions in advance of said weld point and between said weld point and substantially said predetermined point and to thereby cause said current to flow along both said edge portions in curved form in advance of said weld point, and means for exerting pressure on said edge portions at said weld point in a direction forcing said edge faces together.

14. Apparatus as set forth in claim 13 wherein said means for bending said edge portions comprises means for forming said strip into convolutions with the trailing edge portion of said strip in said relation with the leading edge of said strip at said predetermined point.

15. Apparatus as set forth in claim 14 further comprising means in advance of said predetermined point for forming upstanding, longitudinal projections at said edge portions.

16. Apparatus as set forth in claim 15 wherein said means for exerting pressure at said weld point is positioned to apply pressure to said projections.

17. Apparatus as set forth in claim 16 wherein said current source is connected to contacts engageable with said edge portions.

18. Apparatus as set forth in claim 17 wherein said means for exerting pressure comprises two pairs of opposed rolls, one pair on one side of said seam and the other pair on the other side of said seam, said rolls being engageable with said projections for guiding said edge portions and pressing the edge faces together.

19. Apparatus as set forth in claim 14 wherein said forming means comprises an arcuate first forming member having a length of the order of the width of said strip and positioned to engage said strip in advance of said weld point and a tubular member having an inner diameter substantially equal to the outer diameter of th the convolution positioned to surround the convolutions after the weld point.

20. Apparatus as set forth in claim 19 wherein said first forming member is positioned to engage said strip prior to said predetermined point and has the axis of its inner face disposed at an angle to the axis of said tubular member.

21. Apparatus as set forth in claim 20 further comprising means in advance of said forming means engageable with the leading edge portion of said strip for crimping said edge portion and causing the edge face thereof to be parallel to the edge face of the trailing edge portion of said strip, as viewed in cross section, at said predetermined point.

22. Apparatus for welding a helical seam on tubing while winding an elongated strip helically to form convolutions of the tubing, said apparatus comprising in combination: means for forming upstanding, longitudinal projections at the edges of said strip, means for advancing the strip in a substantially rectilinear path at an angle to the axis of the tubing to be formed, forming means for forming said strip into a succession of convolutions with the leading edge of the unformed strip in side-by-side, closely spaced relation with the trailing edge of the formed strip at a predetermined point and with the edge faces in face-to-face relation and with corresponding points on said faces at the same level, and for thereafter maintaining said relation as the strip is advanced but with diminishing spacing between said edge faces until they meet at a weld point subsequent to said predetermined point, high frequency electrical current means for supplying current to said edges in advance of the weld point and between said weld point and substantially said predetermined point to heat same to welding temperature upon reaching said weld point; and means for applying pressure to the longitudinal projections at the weld point in a direction forcing said edge faces together to form a weld therebetween.